United States Patent
Kendall

[15] 3,690,619
[45] Sept. 12, 1972

[54] ENERGY ABSORBING GUARDRAIL

[72] Inventor: Giles A. Kendall, Burbank, Calif.

[73] Assignee: Menasco Manufacturing Company, Burbank, Calif.

[22] Filed: Dec. 10, 1970

[21] Appl. No.: 96,932

[52] U.S. Cl..............................................256/13.1
[51] Int. Cl................................................E01f 15/00
[58] Field of Search.......256/13.1, 1; 94/1.5; 188/32; 114/219

[56] References Cited

UNITED STATES PATENTS

| | | |
|---|---|---|
| 3,369,634 | 2/1968 | Mazelsky..............256/13.1 X |
| 1,600,165 | 9/1926 | Dennebaum............256/13.1 |
| 1,793,676 | 2/1931 | Camp......................256/13.1 |
| 1,931,904 | 10/1933 | Pehrson....................256/13.1 |
| 2,123,167 | 7/1938 | Cain........................256/13.1 |
| 2,890,076 | 6/1959 | Baechler............256/13.1 UX |
| 3,436,057 | 4/1969 | Mazelsky.................256/13.1 |

FOREIGN PATENTS OR APPLICATIONS

| | | |
|---|---|---|
| 1,207,418 | 12/1965 | Germany..................256/13.1 |
| 607,636 | 8/1960 | Italy.........................256/13.1 |
| 439,375 | 12/1967 | Switzerland..............256/13.1 |

*Primary Examiner*—Dennis L. Taylor
*Attorney*—Robert E. Geauque

[57] ABSTRACT

A railing to be located adjacent a roadway, to lessen the impact force of a land vehicle leaving the roadway, which is assembled in a plurality of sections, each section connected to adjacent sections by means of a telescoping hinge and slip joint. A plurality of compressible solid damped springs to be connected to the railing to absorb forces causing lateral movement of the railing.

5 Claims, 7 Drawing Figures

PATENTED SEP 12 1972

INVENTOR.
GILES A. KENDALL
BY R.S. Geangue
ATTORNEY

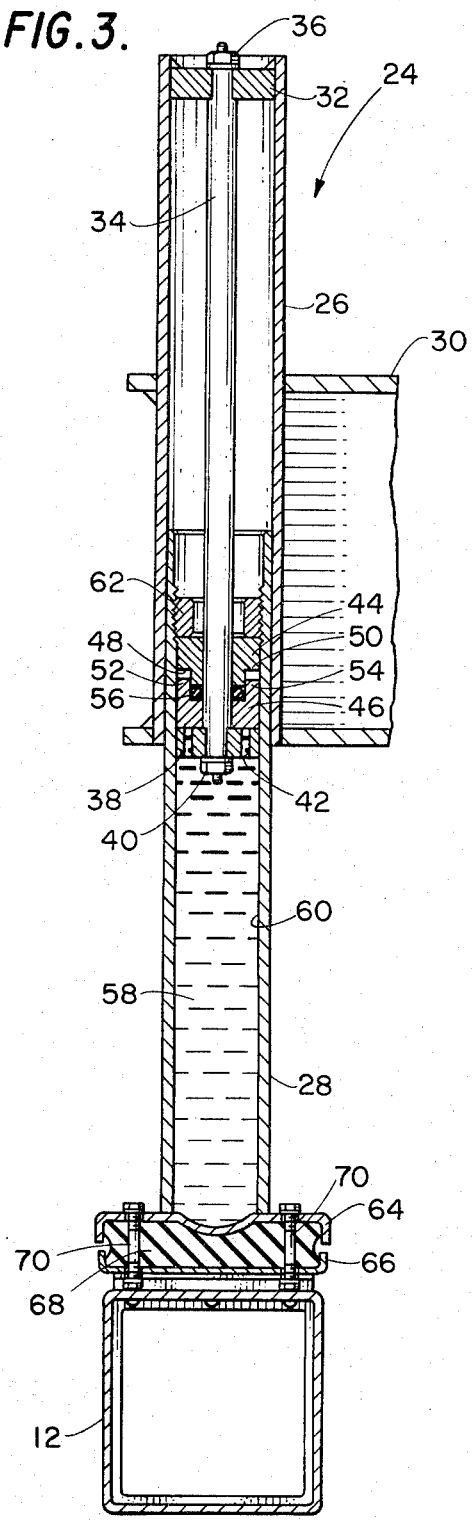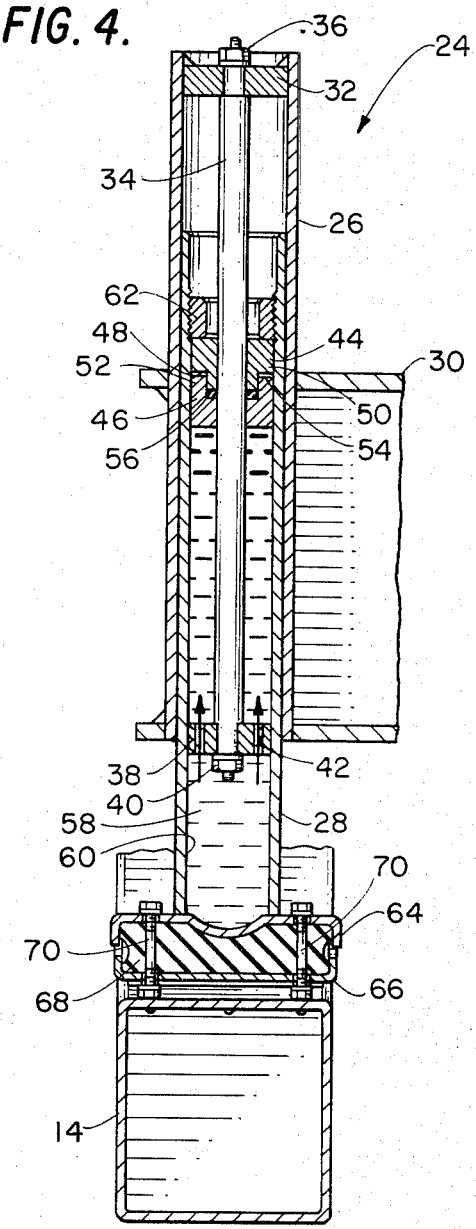

PATENTED SEP 12 1972 3,690,619
SHEET 3 OF 3
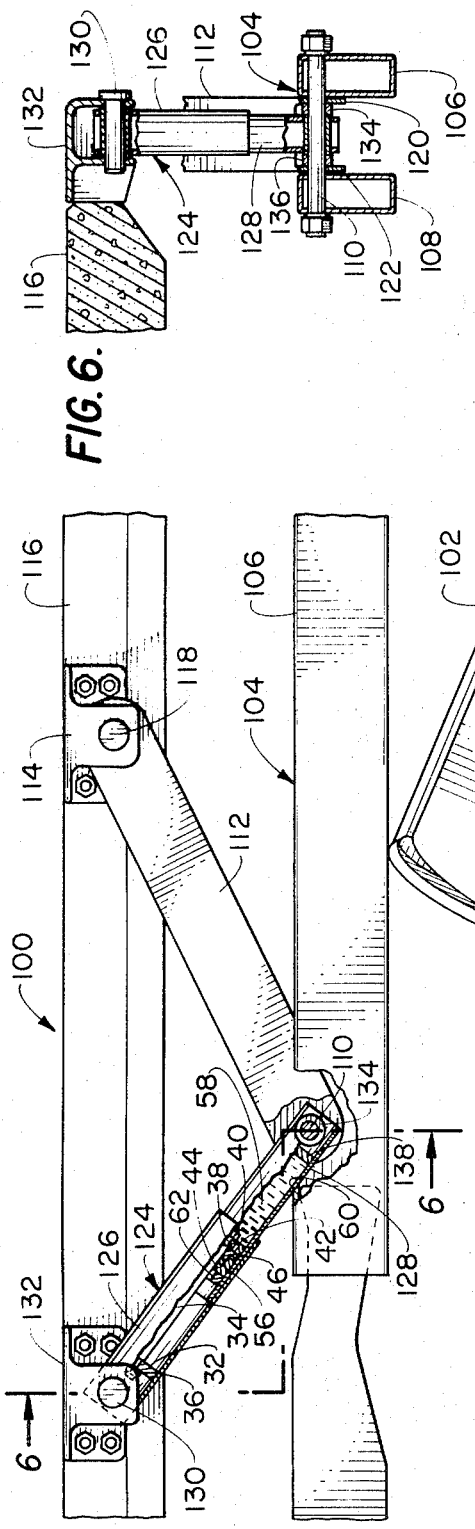
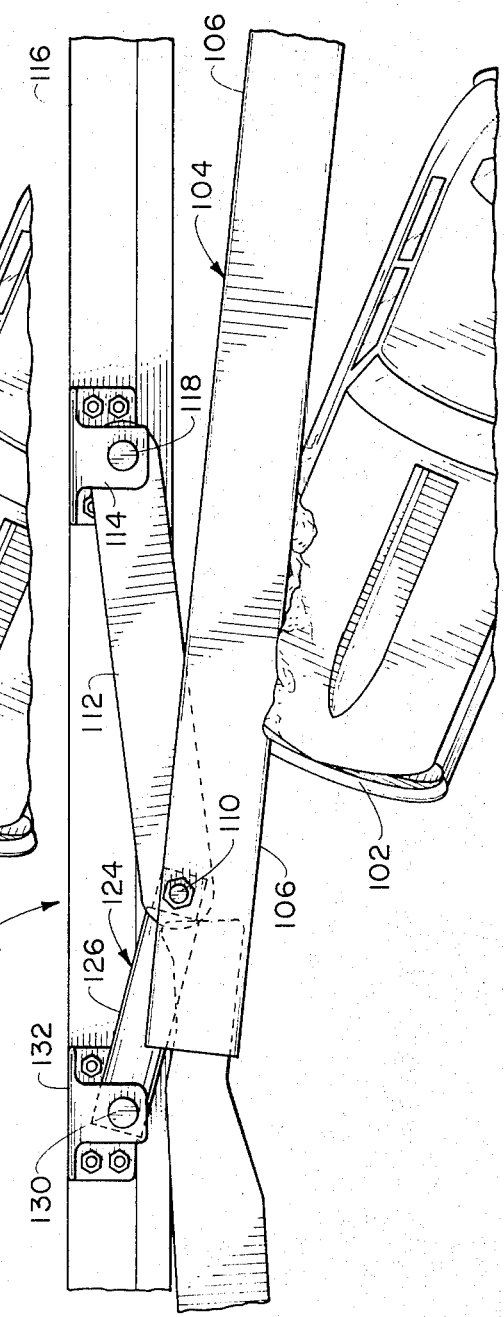
FIG. 6.
FIG. 5.
FIG. 7.
INVENTOR.
GILES A. KENDALL
BY
R. E. Geaugue
ATTORNEY

ENERGY ABSORBING GUARDRAIL

BACKGROUND OF THE INVENTION

Land vehicles such as automobiles are designed to travel on a specified roadway surface. In times past when the roadway surface would be located adjacent a geographical dangerous condition such as a crevice, a guardrail would be placed between the roadway and the dangerous condition. It is the function of the guardrail to prevent a vehicle, which has veered from the roadway toward the dangerous condition, from entering the dangerous condition. The use of such guardrails was soon expanded to avoid automobiles from coming into contact with other conditions such as man made dangers (bridge abutments, opposing automobile traffic, and the like).

In recent years the use of guardrails has been greatly expanded. Super highways are limited access roadways having a plurality of parallel traffic lanes in opposing directions. Such super highways are designed for the vehicles in the opposing traffic lanes to travel at high speeds. It is desirable to insure that the traffic is not able to cross over into an opposing lane.

It is quite common to employ the use of a guardrail between the opposing parallel lanes of traffic. Normally, such a guardrail is rigidly mounted within the roadway and is built of substantially rigid construction which is to absolutely preclude the passing over of a vehicle. Also, similar guardrail construction is employed adjacent the sides of the roadway to prevent vehicles from entering into a dangerous condition. Although the guardrail accomplished the function of preventing a misdirected vehicle from moving in a particular undesired direction, the guardrail was formed so rigid that the misguided vehicle was abruptly stopped with substantial force. As a result, not only did substantial damage incur to the misguided vehicle, but frequently the driver of the vehicle and any accompanying passengers would incur major injuries. Commonly, such injuries would prove to be fatal.

In recent years, in an effort to overcome this abrupt stopping of the vehicle, guardrails have been constructed of various designs and of more resilient materials of constructions. It would be the function of such a guardrail, upon being struck by a vehicle and a certain predetermined impact force being exceeded, the guardrail would fail in a prescribed manner. The failure of the guardrail would absorb a substantial amount of the impact force while not permitting the impact force to exceed a predetermined level. As a result, the extend of injuries incurred by the operator and passengers within the misguided vehicle have been reduced. Also, normally the extent of damage to the misguided vehicle has also been reduced.

However, there are many disadvantages to such failure type of guardrails. Once the railing has failed it must be replaced. This is a substantial expense as such rails cost a substantial amount of money for every foot of length. It is not uncommon for a single vehicle in a single accident to damage 40 to 50 more feet of such a guardrail. An additional disadvantage of failure type of guardrails is that although damage to the vehicle and the potential injuries have been reduced, quite frequently major injuries are incurred to the occupants of the vehicle which have proved to be fatal. Additionally, there have been instances in which the guardrail is hit with so great a force that the complete separating of the guardrail results permitting the vehicle to pass into the opposing lanes of traffic or into the dangerous condition.

It would be desirable to design a guardrail which would be able to absorb a substantial impact force wherein, 1) the guardrail did not incur any significant damage, 2) damage to the vehicle was minor and 3) the stopping forces to which the occupants of the vehicle are subjected are held to a minimum thereby reducing the possibility of injury.

SUMMARY OF THE INVENTION

The guardrail of this invention is to be composed of a plurality of longitudinal segments normally of a prescribed length such as 10 feet. Each of the segments is connected to adjacent segments by means of a telescoping arrangement with the inner telescoping segment having a recessed portion adjacent its end. As a result of the recess, the inward telescoped segment is capable of a limited amount of pivoting movement with respect to the outer telescoped segment. During such pivotable movement no damage occurs to each of the segments.

Each segment is to be supported by a plurality (such as three or four in number) of damped springs. Each damped spring employs the use of a movable piston within which are formed one or more orifices. The piston is located within a chamber wherein a compressible solid material such as a silicone rubber is located. The impact to the segment is transmitted through the piston and is absorbed by the compressible solid material passing through the orifice of the piston as it moves within the chamber. Because of substantial pressure being created within the chamber during movement of the piston, a particular type of sealing arrangement is employed in which seal pressure increases as the impact force increases.

BRIEF DESCRIPTION OF THE DRAWINGS

FIG. 3 is a cross-sectional view of a single damped spring employed within this invention taken along line 3—3 of FIG. 1;

FIG. 4 is a cross-sectional view through the damped spring employed within this invention taken along line 4—4 of FIG. 1;

FIG. 5 is a view similar to FIG. 1 but showing a second embodiment of the guardrail of this invention;

FIG. 6 is a sectional view through the second embodiment of the guardrail of this invention taken along the line 6—6 of FIG. 5; and FIG. 7 is a view similar to FIG. 5 but showing the second embodiment in the impact position.

DETAILED DESCRIPTION OF THE SHOWN EMBODIMENT

Figure 1:
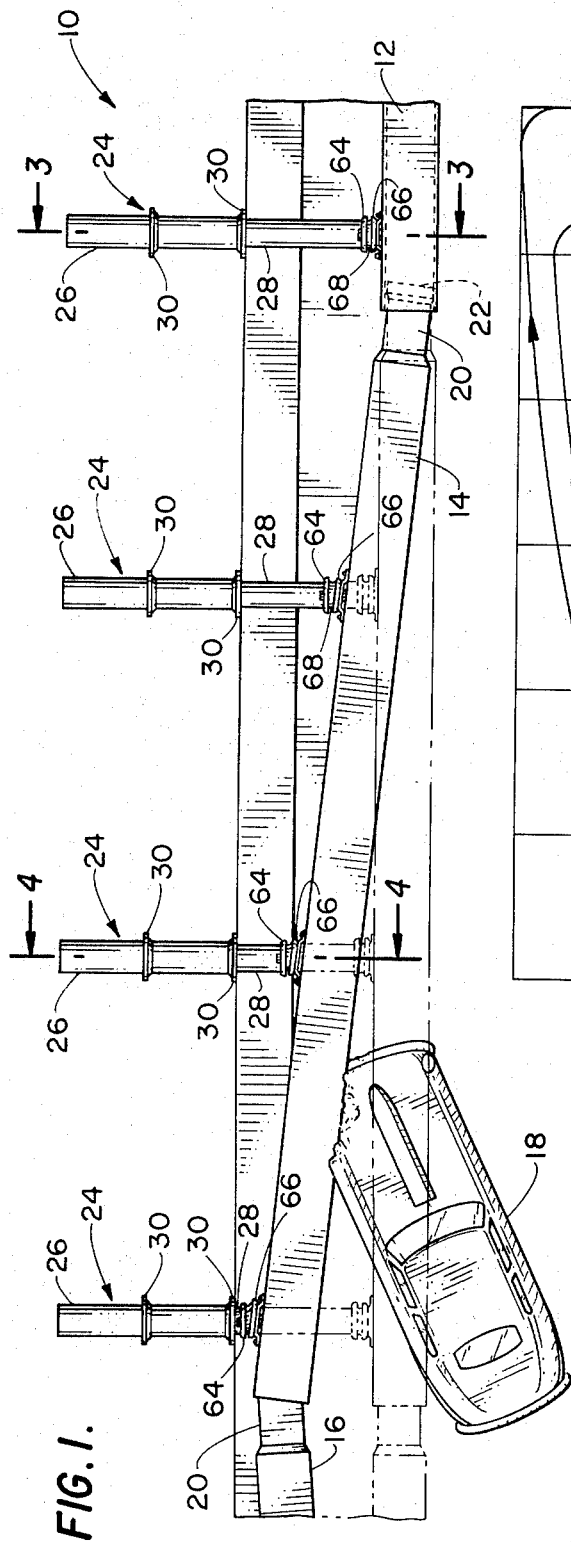
FIG. 1 is a plan view of the guardrail of this invention showing the movement of the guardrail from the non-impact position to the impact position.

Referring particularly to FIG. 1 of the drawings, there is shown a guardrail 10 of this invention having a plurality of joined together impact rails 12, 14 and 16. Each of the impact rails are identical in construction and would normally be of a polygonal cross-sectional configuration such as a square shape. However, the particular cross-sectional design of the impact rail is to be considered a matter of choice or design, it only being necessary that the rail be designed so as to be able to be struck by an automobile 18 without failing. Each of the impact rails include a recessed area 20 adjacent one end thereof. A short length shoulder 22 is located between the recessed area 20 and the end thereof. The impact rails 12, 14 and 16 are assembled together so that each rail is slidingly telescoped within another rail. The length of the shoulder 22 is to be such as to permit a certain amount of pivoting action of impact rail 14 with respect to impact rail 12. Action is limited by the depth of the recess area 20 upon it coming into contact with the edge of the outer telescoped impact rail. Each of the impact rails 12, 14 and 16 are designed to be of a particular length such as 10 feet. The depth of the recess area 20 is selected so that, upon the maximum allowable lateral deflection of the inner impact rail, the surface of the recess area 20 is just coming into contact with the edge of the outer impact rail.

Each of the impact rails 12, 14 and 16 are supported by means of a plurality of damped spring assemblies 24. Each of the damped spring assemblies 24 are identical to each other and normally equally spaced from each other. It is envisioned that there will be between three and four in number such damped spring assemblies employed in combination with each impact rail. However, the particular number of such damped spring assemblies is to be considered a matter of choice or design and may be modified in actual usage.

Each damped spring assembly 24 includes an outer cylindrical housing 26 and an inner cylindrical housing 28. The inner cylindrical housing 28 is telescopically movable in a tight fitting manner within the outer cylindrical housing 26. The outer cylindrical housing 26 is fixedly supported to the supporting beam 30 which is to be secured to appropriate fixed structure to support the guardrail 10 of this invention in a particular location (such as between opposing parallel traffic lanes in a roadway). Fixedly secured within the outer cylindrical housing 26 is a disc 32. Axially supported within the outer cylindrical housing 26 and fixedly secured to disc 32 is a shaft 34. Shaft 34 is to be secured to disc 32 as by nut 36. The other end of shaft 34 is fixedly secured to piston 38 as by a nut 40. Piston 38 is to be movable in a snug fitting manner within inner cylindrical housing 28. A plurality of orifices 42 are to be located through the piston 38. The function of orifices 42 will be explained further on in the specification.

Surrounding the shaft 34 is a fixed element 44 and a movable element 46. Movable element 46 is to be longitudinally movable with respect to shaft 34 and also movable toward and away from fixed element 44. Fixed element 44 includes an outer annular recess 48 and an inner annular protrusion 50. Movable element 46 includes an outer annular protrusion 52 and an inner annular recess 54. The outer annular protrusion 52 is to matingly cooperate with the outer annular recess 48 as shown in the drawings. Also, the inner annular protrusion 50 is to cooperate in a mating manner with the inner annular recess 54. A rubber seal 56 is to be located between the inner annular protrusion 50 and the inner annular recess 54. The seal 56 is to be in diametrical contact with the surface of outer annular protrusion 52 and the shaft 34 as shown in the drawings. It is the function of the seal 56 to prevent passage of the material 58 located within the chamber 60 past shaft 34. As will become apparent further on in the specification, substantial pressures are to be created within chamber 60 and the sealing arrangement provided by seal 56 absolutely precludes the flow of material past shaft 34. The amount of force which is applied to the surface area of movable element 46 is transmitted to the smaller surface area of inner annular recess 54. Because the area of recess 54 is smaller, the force per unit area upon recess 54 is greater than that applied to the surface of movable element 46. As a result, greater pressure is effected against the seal 56 than that transmitted to the movable element 46. As the pressure upon the movable element 46 increases, the pressure tending to compress seal 56 increases at a proportionately greater amount. Therefore, a tighter seal results between shaft 34 and seal 56 as the pressure becomes progressively greater. Therefore, as the pressure increases to where leakage would be more apt to occur, a more positive seal also occurs.

A gland nut 62 is threadingly associated within inner cylindrical housing 28 to locate the position of the fixed element 44 which the nut 62 is in abutting contact therewith. It actually is to be the function of gland nut 62 that, with the amount of material 58 located within chamber 60, by tightening down of nut 62, thereby moving both elements 44 and 46, an initial amount of compression can be established within the material 58 within chamber 60. The reason for this will become apparent further on in the specification.

The inner cylindrical housing 28 is closed off at its free end thereof by means of a first cup 64. A second cup 66 is fixedly secured to its appropriate impact rail 12, 14 or 16. A rubber or the like shock absorbing material 68 is located between the first cup 64 and the second cup 66 with the cups 64 and 66 in a facing relationship. Bolts 70 are to connect together the first cup 64 and the second cup 66 with the material 68 located therebetween. The function of the shock absorbing material 68 is to permit a certain amount of tilting movement of the second cup 66 with respect to the first cup 64 as will become more apparent further on in the specification.

The material 58 is not envisioned to be a fluid but is to be composed of what is termed a compressible solid. A compressible solid will take the form such as silicone rubbers (silastics) or other silicone base solids, natural or synthetic rubber compounds, metalic sodium, potassium, cesium, or lithium. The silicone rubbers are produced from dimethyl polysiloxanes in which various vulcanizing agents are incorporated to obtain various degrees of hardness and thereby various degrees of sheer strength. The mark "silastic" is a trade name for the silicone rubbers produced by Dow Corning, and these rubber products are available in a wide range of unit sheer strength and compressibility.

As the piston 38 is moved within chamber 60, the compressible solid material 58 bleeds through orifices 42 to the other side of the piston 38 as would be shown in a comparison of FIG. 4 with FIG. 3. For a detailed explanation of the features of a compressible solid when employed within a damped spring, reference may be had to U.S. Pat. No. 3,053,526 issued Sept. 11, 1962, by the assignee of the present invention.

There are two basic desirable characteristics of employing such a compressible solid: 1) Substantial absorption of energy, and 2) Automatic return of the piston head 38 to the original position after absorption. It is to be apparent that movement of the shaft 34 into chamber 60 will result in a reduction of the internal volume of the compressible solid 58. As a result, a corresponding increase in internal pressure of the solid 58 occurs. Actually, if the initial internal force is established at one thousand pounds per square inch (by means of moving gland nut 62), upon full insertion of shaft 34 within chamber 60, the internal pressure of the material 58 will rise to something on the order of 6000 pounds per square inch. This internal pressure results in a force being applied to the piston head 38 which tends to move the piston head back to the position of lowest internal force within the material 58, in other words, adjacent movable element 46. However, there will also be frictional forces created along the circumference of shaft 34. However, this frictional force is substantially less than the lowest return force which would be the initial internal force selected by gland nut 62. Therefore, return of piston 38 to its initial position is always assured.

The operation of the guardrail 10 of this invention is as follows: It will be assumed that the guardrail was initially in the position as shown in phantom lines in FIG. 1 of the drawing. The impact rail 14 is shown being struck by an automobile 18 at approximately 25° degree angle. If the automobile 18 is of a 5000 pound weight, at 65 miles per hour, the particular damped spring which receives the greatest proportion of impact force will be compressed to amost its full stroke. The amount of force to be absorbed by the damped springs is variable by a proper selection of the area of the piston head 38, the size of the orifices 42, the length of stroke, and the particular form of compressible material 58. However, it is desired that the aforementioned combination of characteristics be selected so that the maximum force to which the occupants of the automobile 18 would be subjected, would be that force normally less than what would result in serious (possibly fatal) injuries. It is to be understood that automobile 18 upon contacting the impact rail 14 will tend to slide along the rail and more than likely will move from one rail to the next rail. It is not uncommon in a normal accident for an automobile to move 30 or 40 or more feet along the guardrail.

As previously stated, the impact rails 12, 14 and 16 are so constructed as to not deform permanently in any manner upon contact by the automobile 18. Upon the impact rail 14 moving from the phantom position shown in FIG. 1 to the solid position, a plurality of damped springs 24 will be compressed each at varying degrees of compression. As each of the damped springs 24 compresses, the piston head 38 is moved further within chamber 60 causing passage of the compressible solid material through orifices 42 to the opposite side of the piston head. In this way absorption of the impact force of the vehicle 18 is effected. Also, as previously stated, because shaft 38 takes up a portion of the volume of chamber 60, a rise in the internal pressure within the material 58 is caused. This rise in internal pressure creates a force unbalanced about piston head 38 which tends to move the piston head 38 back to its initial position in abutting contact with movable element 46. In actual practice it has been found upon stoppage of the vehicle 18 against the laterally moved impact rail, the vehicle 18 will be slowly pushed back toward the surface of the roadway as the impact rail moves back to its initial position. As previously mentioned, the O-ring seal 56 is compressed at a proprotionately greater force per unit area during the increase of the internal pressure within the material 58. Therefore, it is assured that no leakage of the compressible solid will occur about shaft 34 exteriorly of chamber 60.

Figure 2:
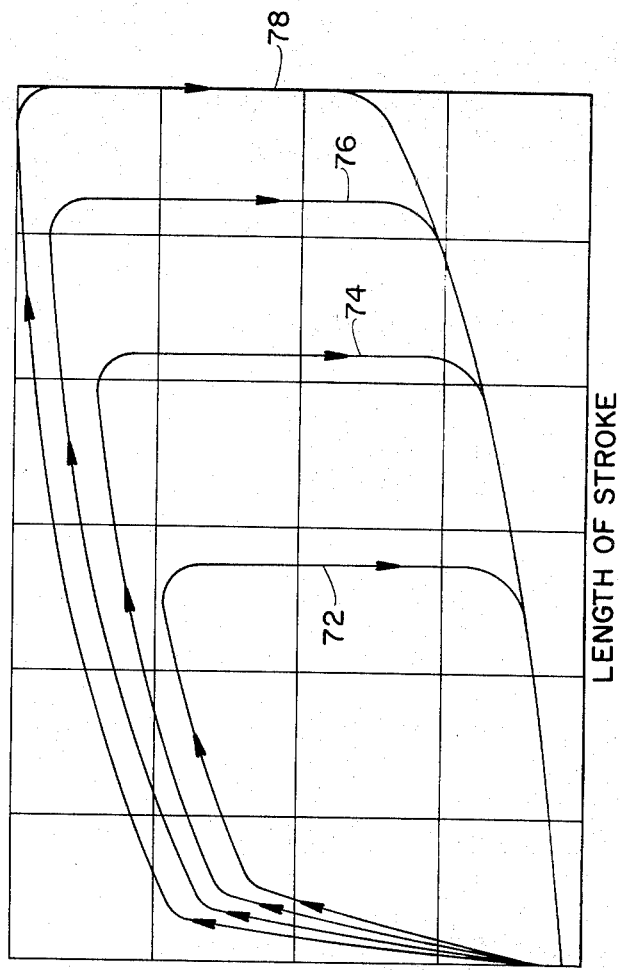
FIG. 2 is an impact force-stroke graph of the energy absorbing characteristics of the compressible solid material employed within the damped spring used within this invention.

Referring particularly to FIG. 2 of the drawings, a force diagram is shown which depicts the absorbing characteristics of each damped spring as well as the return force characteristics. As can be seen, lines 72, 74, 76 and 78 each represent progressively greater impact forces to which the damped spring might be subjected. The load is greater in each case and also the length of the strike of the shaft 34 is correspondingly greater. As can be seen from FIG. 2, the representation of the impact load absorbing characteristics represented by lines 72 through 78 are each basically similar. Initially, a substantial portion of the force is experienced within a relatively short amount of stroke. Then there is a substantial length of stroke movement with a relatively small increase in impact force. Upon the car being brought to rest and the impact force reaching the maximum level, the return is initiated by a substantial decrease in the impact force but the length of stroke remains constant. The final stage of the cycle is to effect a reversal of the length of stroke causing the length piston head to move back to its initial position with only a small change in the impact force. Upon the initial position again being achieved, the force remaining within material 58 is only the internal force to which the material 58 has been compressed by gland nut 62.

Referring particularly to the embodiment of FIGS. 5–7 and the drawings, there is shown a guardrail 100. The guardrail 100 is designed to be primarily a unidirectional impact guardrail with the vehicle 102 to contact the impact rail assembly 104 in the direction in FIG. 5 of the drawing. Each length of the impact rail assembly 104 includes dual impact rails 106 and 108 which are bolted together by bolt 110. It is to be noted that in this embodiment two such rails 106 and 108 are employed for each segment length of the guardrail 100. Each of the rails 106 and 108 are telescopingly connected similar to the arrangement discussed as to the first embodiment.

The main beam 112 is pivotally mounted by means of the mounting bracket 114 to a fixed abutment 116 which is adjacent the roadway from which it is desired to protect the vehicle from striking. Pivot pin 118 connects the main beam 112 to the mounting bracket 114. The free end of the main beam 112 is bifurcated into legs 120 and 122. The legs 120 and 122 are to include aligned apertures which are to cooperate with bolt 110. Leg 120 is to be located adjacent impact rail 106 with leg 122 to be located adjacent impact rail 108. The material of construction of the impact rail 112 would generally be steel or other high strength material.

A damped spring assembly 124 is to be employed which includes outer cylindrical housing 126 and inner cylindrical housing 128. The inner cylindrical housing 128 is telescopingly mounted within the outer cylindrical housing 126. The outer cylindrical housing 126 is connected by means of pivot pin 130 to a mounting bracket 132, the bracket 132 being fixedly secured to the abutment 116. The inner cylindrical housing 128 is centrally pivotally mounted upon bolt 110. Spacing sleeves 134 and 136 are located about bolt 110 and on each side of the inner cylindrical housing 128 to maintain the central spacing thereof between the legs 120 and 122.

The construction of the damped spring assembly 124 is substantially identical to the damped spring 24 previously described. Therefore, reference to the foregoing description is to be had for discussion of the operation of the damped spring assembly 124, with like numerals upon the assembly 124 being employed to refer to like parts on the assembly 24. The only difference between this assembly 124 and assembly 24 is that a plug 138 is employed adjacent the free end of the inner cylindrical housing 128 to close off the free end of the compressible solid chamber 60.

The operation of the embodiment 100 is as follows: It will be assumed that the guardrail is in the non-impacted state shown in FIG. 5 of the drawings. In this position the piston 38 is adjacent movable element 46. Upon a vehicle coming into contact with the dual impact rail assembly 104 composed of rails 106 and 108, pivotal movement of main beam 112 occurs. Pivotal movement of the damped spring assembly 124 also occurs. As a result, the piston 38 tends to move into the chamber 60 causing the compressible solid material to pass through the orifice 42. Therefore, a damping of the impact force from the vehicle 102 occurs. After impact, the impact rail assembly is moved back to the position shown in FIG. 5 of the drawing by means of the force imbalance about piston 38 which was described as to the first embodiment.

It is envisioned that within the second embodiment 100, only a single damped spring assembly 124 will be employed for each of the impact rail assembly 104. However, it is to be understood that this is a matter of design and it may be desired to employ two or more such damped spring assemblies 124 for each segment of length of the impact rail assemblies 104.

A primary advantage of the foregoing guardrail system is that there is essentially no maintenance of the guardrail after impact. This is to say that after deflection of the impact rails, no portion of the impact rails should have resulted in failure, in other words, exceeding the elastic limit of the material of construction of the impact rails. Further, movement of the impact rails back to the initial position, after impact by the vehicle, occurs automatically due to the increased internal pressure within material 58. Therefore, under normal conditions, there is absolutely no maintenance such as replacing any of the elements of the guardrail after impact. It is well known that with the use of the present type of guardrails that are designed to fail plastically and thereby absorb energy, substantial expense is incurred in the replacing of such guardrails after impact. The return movement of the piston head 38 of each damped spring 24 to its initial position is accomplished quite slowly so as to not cause any additional injury to the occupants of the vehicle or any injury to any persons who may be in close proximity to the vehicle.

What is claimed is:

1. In a guardrail for absorbing the impact force of a vehicle which has veered from its desired path, a first rail, a second rail, said rails connected to a supporting means, said supporting means comprising a rigidly fixed means and an energy absorption means, said energy absorption means connecting said rigidly fixed means to said rails, either of said rails being able to incur direct contact by the vehicle, one end of said first rail being telescopingly connected within an adjacent end of said second rail, said telescoping connection permitting pivotal and longitudinal movement of said first rail with respect to said second rail, said telescoping connection comprising a shoulder on said one end of said first rail slidably received within said adjacent end of said second rail, a recessed portion within said first rail, said recessed portion being located adjacent said shoulder of said first rail to permit relative movement between said one end and said adjacent end, vehicle impact upon at least one of said rails producing relative pivotal movement of said rails about said shoulder and bodily movement of at least one of said rails toward said rigidly fixed means.

2. Apparatus as defined in claim 1 wherein:
said recessed portion extending about the entire periphery of said first rail.

3. Apparatus as defined in claim 1 wherein:
said energy absorption means including a damped spring means connected to each of said rails intermediate its ends, said rails being adapted to directly contact the vehicle, either of said rails being movable from an outward position to an inward position upon impact by the vehicle, said damped spring means causing automatic return movement of said rails after impact from said inward position to said outward position.

4. A guardrail as defined in claim 3 wherein:
said damped spring means includes a plurality of separate damped spring units to be spaced apart along said rails and employing a compressible solid as the working medium, and means for connecting each of said damped spring units to one of said rails to permit angular pivotal movement of a said rail relative to said unit.

5. A guardrail as defined in claim 4 wherein:
each of said damped spring units includes a movable piston connected to a shaft, said piston located within a closed chamber containing said compressible solid, a sealing assembly mounted about said shaft to prevent leakage of said compressible solid from said chamber, the internal pressure of said compressible solid to vary during movement of said piston, and being limited in any one of said units to that which will not result in serious injury to the occupants of said vehicle.

* * * * *